United States Patent [19]

van der Meer

[11] 4,149,791

[45] Apr. 17, 1979

[54] COMBINATION FOCUSSING SCREEN AND FILM HOLDER ATTACHMENT

[75] Inventor: Jan van der Meer, Enschede, Netherlands

[73] Assignee: Polaroid Corporation, Cambridge, Mass.

[21] Appl. No.: 865,789

[22] Filed: Dec. 30, 1977

[51] Int. Cl.² .............................................. G03B 17/44
[52] U.S. Cl. ................................................... 354/161
[58] Field of Search ........................... 354/161; 355/44

[56] References Cited

U.S. PATENT DOCUMENTS

| | | | |
|---|---|---|---|
| 493,365 | 3/1893 | Low et al. | 354/161 |
| 2,549,670 | 4/1951 | Dalton | 354/161 |
| 3,786,735 | 1/1974 | Seiden | 354/161 |
| 3,896,464 | 7/1975 | Galvin | 354/161 |

Primary Examiner—John Gonzales
Attorney, Agent, or Firm—Karl H. Hormann

[57] ABSTRACT

An attachment for a photographic camera for alternately maintaining a focussing screen and a film holder in an operative position with respect to a camera. The attachment is provided with a focussing screen rendered movable by connection to a rotatable shaft between operative and operative positions to permit placement of the film holder when the screen is in its inoperative position. Locking means actuated by the rotatable shaft are provided to lock the focussing screen or the film holder in operative positions. Also, means operated by rotation of the shaft are provided to control the condition of the camera shutter.

11 Claims, 4 Drawing Figures

COMBINATION FOCUSSING SCREEN AND FILM HOLDER ATTACHMENT

BACKGROUND OF THE INVENTION

1. Field of the Invention

The present invention relates to photographic apparatus and more particularly to a camera head for alternately maintaining a focussing screen and a film holder in an operative position with respect to the camera.

2. Description of the Prior Art

In photography so-called view or press cameras are replete. In fact, such cameras trace their roots to the infancy of photography. Nevertheless and significant advances wrought in the photographic arts notwithstanding, such cameras have never lost their appeal or their usefulness. They are widely employed in photographic studios or on photographic copying systems. Advantages such cameras offer are, for instance, that they are provided with ground glass focussing screens placed directly to intersect the optical axis of the lens of such cameras and identical in size to the format of the film used. Hence, they permit a photographer to compose his picture carefully and precisely, though inverted from the image rendered by the film.

Examples of such cameras may be found, for example, in U.S. Pat. No. 493,365 issued to Law and Shakespeare on Mar. 14, 1893 and U.S. Pat. No. 3,896,464 issued to Galvin on July 22, 1975. A device for alternately holding a focussing screen and a film holder is the subject of U.S. Pat. No. 3,786,735 issued to Seiden on Jan. 22, 1974.

All these have in common that they show focussing screens movable with respect to supporting structure to make possible placement of a film holder or the like. Thus in U.S. Pat. No. 493,365 a ground glass is shown mounted on a camera back by a plurality of pivotable links and movable from a focussing position in direct engagement with the camera to a position remote therefrom by links pivotable by rotating a shaft.

In U.S. Pat. No. 3,896,464 a view camera is shown having a ground glass viewing screen resiliently maintained against its back by means of spring biased arms. A film holder may be mounted on the camera by grasping the frame of the ground glass screen, lifting or tilting it off the camera back against the bias of the spring and sliding the film holder between the screen and camera back where it is then held by the tension of the arms to which the screen is attached. A somewhat similar arrangement is disclosed by U.S. Pat. No. 3,786,735 where a viewing screen is held in position by torsion bars. To place a film holder into the depicted apparatus the viewing screen is lifted away from the apparatus by grasping either one of two corners of the viewing screen and the film holder is then inserted into the resulting gap. It is held in position by the tension of the viewing screen torsion bars.

While prior art apparatus have been functioning properly, they have on the whole been inconvenient to use because proper positioning of viewing screens and film holders has involved cumbersome structures and awkward manipulations.

SUMMARY OF THE INVENTION

The present invention provides for an apparatus of simple construction which allows placing focussing screens or film holders on the backs of cameras by extremely easy operations.

An embodiment of the invention will be described by way of example in the following description, and the features which characterize the invention will be pointed out with particularity in the annexed claims.

DESCRIPTION OF THE PREFERRED EMBODIMENT

Figure 1:
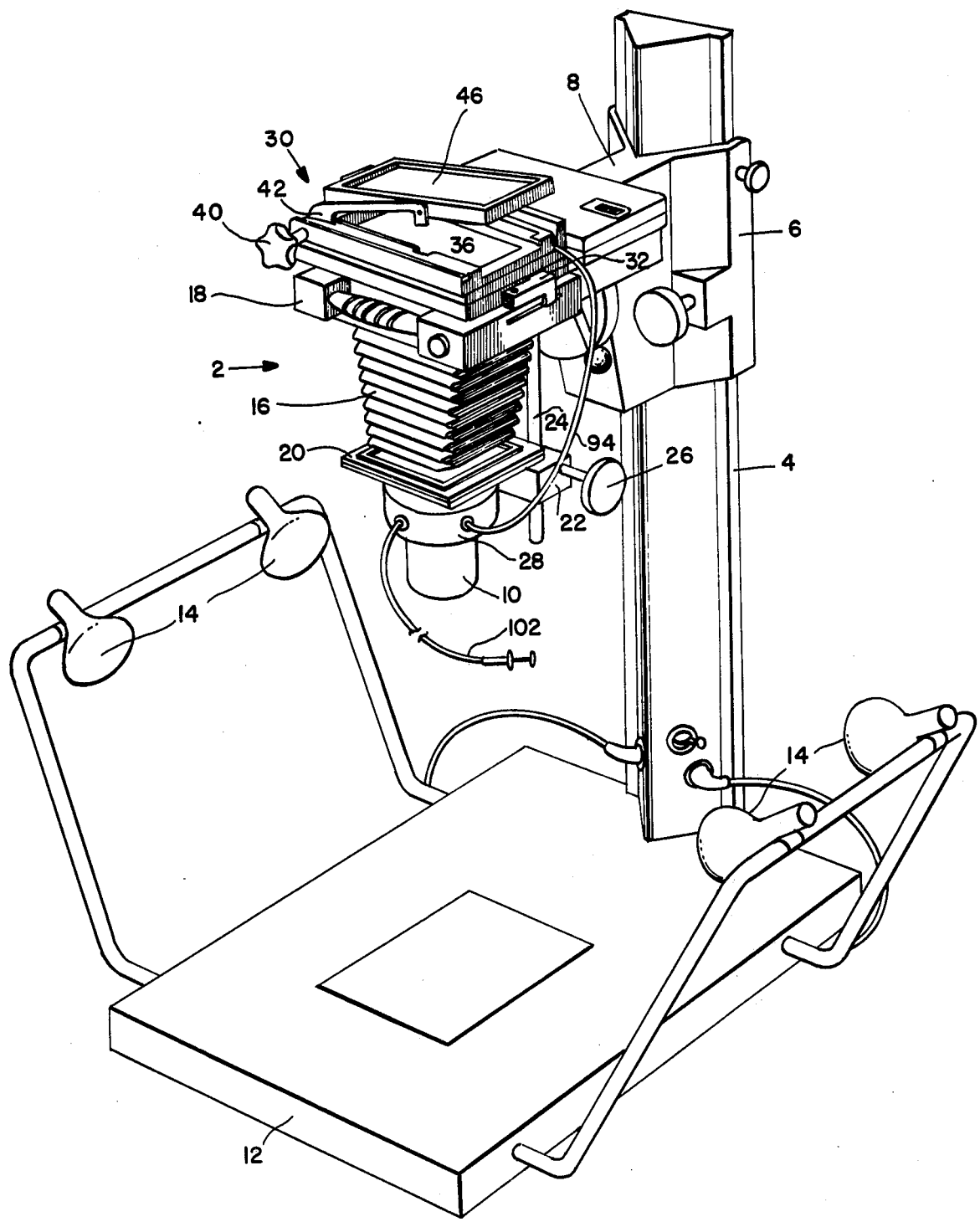
FIG. 1 is a perspective view of a camera arrangement incorporating structure in accordance with the invention.

In FIG. 1 a camera 2, known as a view camera, is shown mounted on an upright post 4 by means of a bracket 6. The camera 2 is attached to a cantilever arm 8 extending from the bracket 6 in such a manner that a lens mounted in a conventional tubus 10 faces a plate member 12 so that objects placed on the plate 12 may be photographed. To provide for adequate illumination of the object a plurality of lamps 14 are provided in suitable orientation relative to the plate 12. The post 4, as shown, is attached to the plate 12.

Focussing of the lens is accomplished by extending or contracting a bellows 16 provided between the back 18 of the camera 2 and a lens board 20. A bearing block 22 attached to the lens board 20 and slidably received on a rod 24 is used to extend or contract the bellows 16 by rotating a shaft 26 journalled in the block 22 to be in frictional or toothed engagement with the rod 24. A shutter the function of which is described infra, and an adjustable diaphragm are also supported by the lens board 20, within a housing 28.

Removably mounted on the back 18 of the camera 2 is a novel focussing screen and film holder device, hereafter called camera head, 30, incorporating the present invention. Clamps 32 are provided by means of which the camera head 30 is releasably fastened to the camera back 18.

Figure 4:
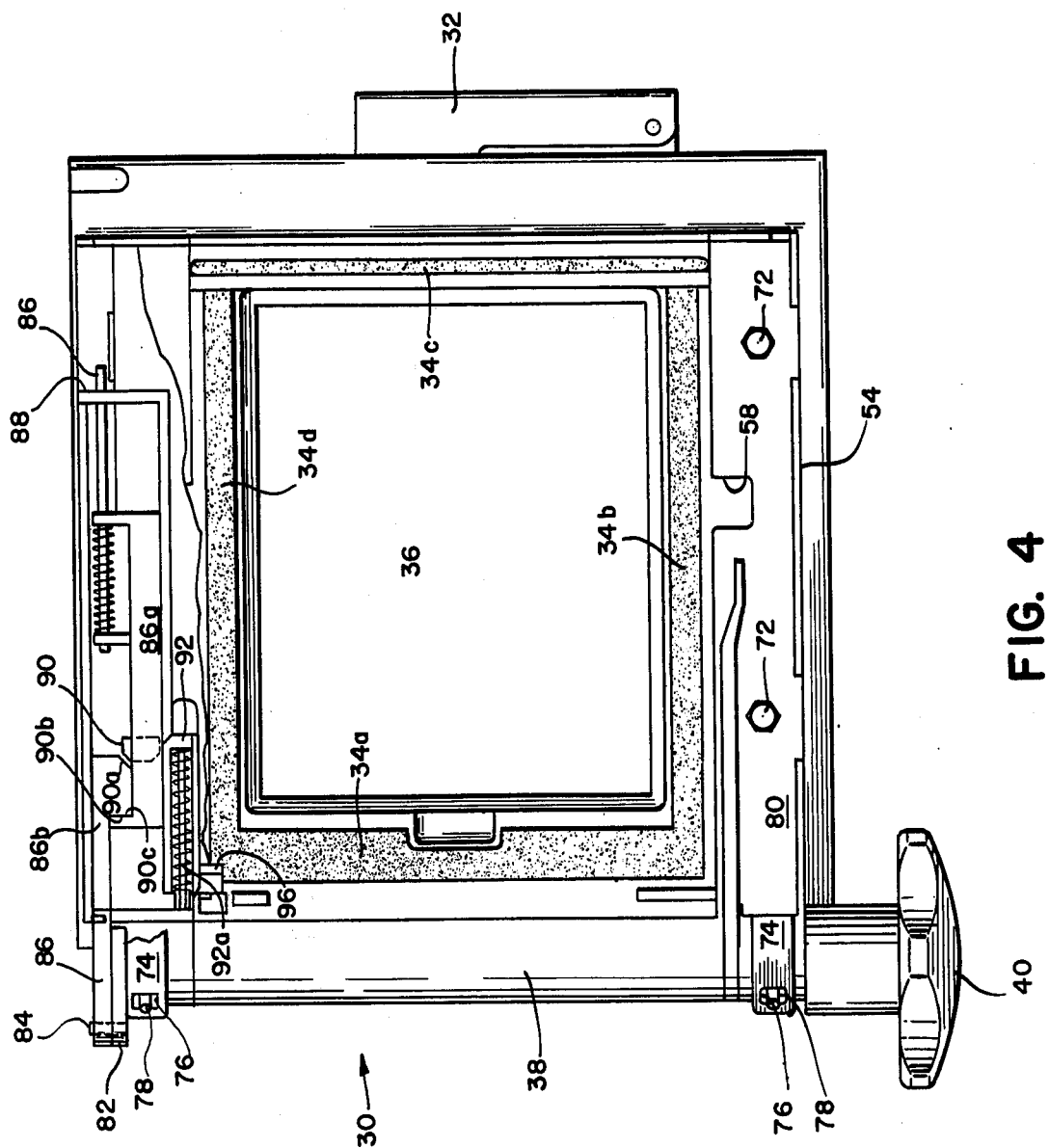
FIG. 4 is a planar view of the apparatus with parts broken away for clarity.

As may be seen from FIG. 4 the camera head 30 comprises a frame-like member formed of four side sections 34a, b, c, d and defining a rectangular aperture 36 the center of which intersects the optical axis of the lens when the camera head 30 is mounted on the camera 2 as shown in FIG. 1.

Figure 2:
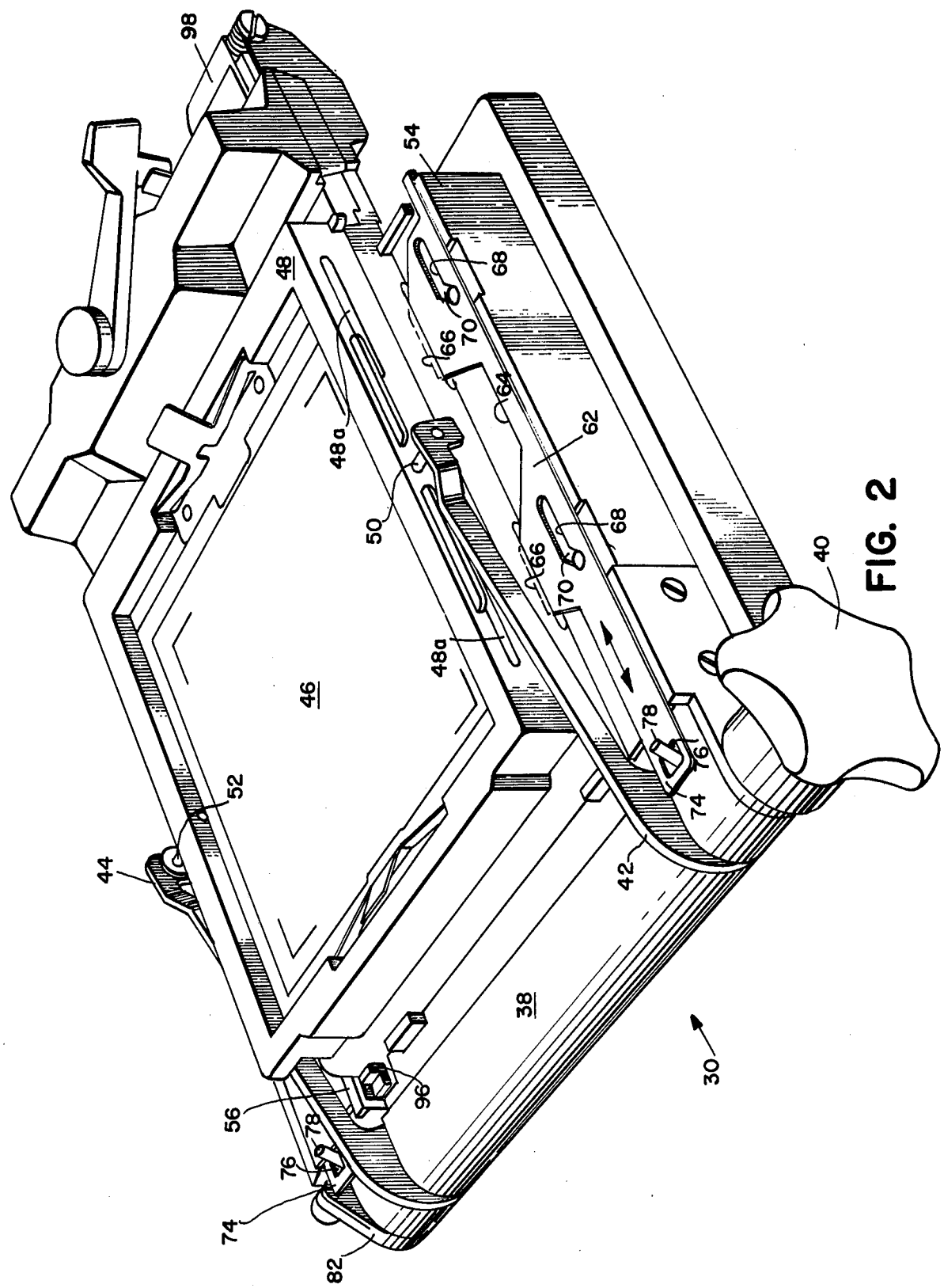
FIG. 2 is a perspective view, on an enlarged scale, of an apparatus embodying the invention, with parts removed for clearness, and including a film holder.
Figure 3:
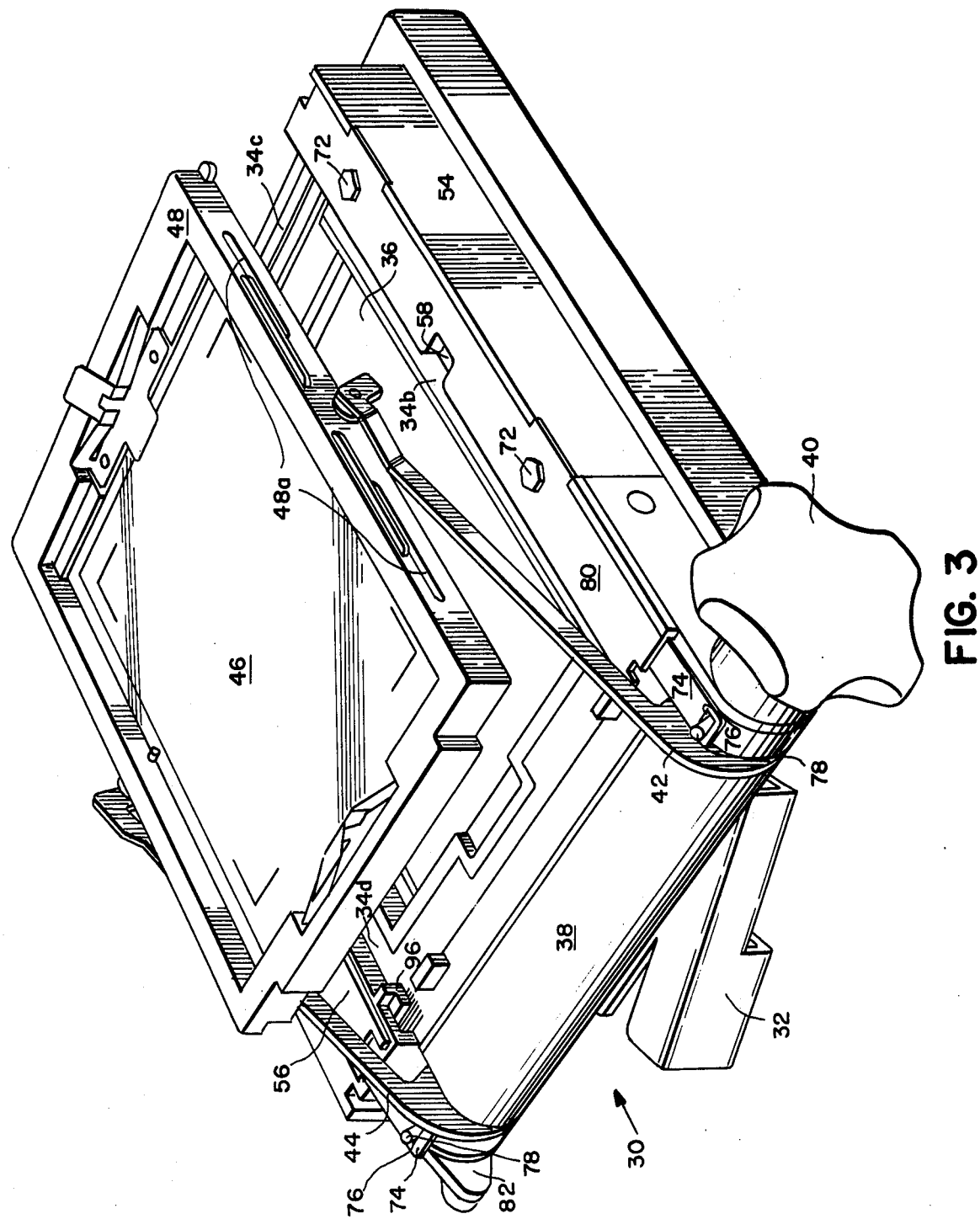
FIG. 3 is a view, similar to FIG. 2, of the apparatus with the film holder removed.

Extending along, and attached to, the side of the frame section 34a opposite its side facing the aperture 36 is a U-shaped cover member 38. The cover member 38 serves to shield a shaft (not shown) which is journalled for rotation, by way of a knob 40, in suitable bearings (not shown) mounted on the frame section 34a. Mounted on the shaft, as best seen in FIGS. 2 and 3, are two symmetrical arms 42 and 44 extending in parallel relationship and closely adjacent frame sections 34b and 34d, respectively. The arms 42 and 44 are attached to the shaft by lost motion connections well known in the art and pivot with respect to the frame 34a–d when the shaft is rotated by means of the knob 40. The arms 42 and 44 are preferably spring biased in the direction of the frame sections 34b and 34d. As shown in FIGS. 2 and 3, the arms 42 and 44, at their ends opposite the ones attached to the shaft, support between them a focussing screen 46. The focussing screen 46 may, for instance, be formed of translucent ground glass surrounded by a rigid frame 48 the sections of which are aligned to extend in parallel to respective frame sections 34a-d of the camera head 30. Pins 50 and 52 mounted substantially in the center of those sections of the frame 48 which extend in parallel to frame sections 34b and 34d serve pivotably to connect the frame 48 to the arms 42 and 44. The ground glass screen 46 is of a size substantially equal to the aperture 36 of the camera head 30, and the frame 48 is dimensioned so that it may rest on frame sections 34a-d. Slots 48a on either side of pins 50 and 52 in frame 48 serve at times to lock the screen 46 in an operative position as explained below.

As shown in FIGS. 2-4, there are provided longitudinal members 54 and 56 extending substantially the length of, and raised from, the frame sections 34b and 34d. The members 54 and 56 are offset from the margins of the aperture 36 by a distance sufficient to accommodate between them the screen frame 48. Voids 58 and 60 provided in the members 54 and 56, respectively, serve to receive parts of the arms 42 and 44 and the pins 50 and 52 when the focussing screen 46 is nested between the raised members 54 and 56 and is resting on the frame sections 34a-d.

Each of the members 54 and 56 supports a locking means 62 in the form of a blade and provided with a cut out portion 64 shaped to prevent interference with the voids 58 and 60. FIG. 2 shows one of the blades 62, another one, symmetrically arranged, is located in member 56 on the opposite side of the aperture 36. The blade 62, preferably made of shim stock, is positioned in a plane parallel to the aperture 36. Furthermore, it is provided with edges 66 located on either side of the cut out 64 and positioned in parallel to the margin of the aperture 36 defined by frame section 34b. Two axially aligned slots 68 having bevelled portions 70 are received on screws 72 or the like to hold the blade 62 on the member 54. An extension 74 of the blade 62 is positioned to extend over the rotatable shaft at sections not covered by cover member 38. The extension 74 has an orifice 76 in which is received a pin 78 radially extending from the rotatable shaft and connected thereto by a common lost motion connection (not shown) for purposed described infra. By virtue of its connection to the rotatable shaft and of the bevelled slots 68 the blade 62 may be moved transversally and longitudinally with respect to the aperture 36 when the shaft is rotated. As shown in FIGS. 3 and 4, the blade 62 is covered by a flat piece 80, for instance of stamped metal. The cover piece 80, too, is provided with a cut out section aligned with the void 58 in the member 54. The spacing between the cover piece 80 and the blade 62 is such that limited pivotal movement of the blade 62 about its longitudinal axis is possible.

At its end opposite knob 40 the rotatable shaft carries a crank 82. The crank 82 is connected, by way of a rivet 84 or the like, to a rod 86. The rod 86 is slidably supported in raised member 56 and extends normal to the rotatable shaft. Thus, when the crank 82 is rotated the rod 86 is moved linearly within member 56, the direction of movement depending on the direction of rotation of the crank 82. The rod 86 has been shown (FIG. 4) as comprising two sections 86a and 86b. Section 86a is protruding into a recess 88 provided in member 56 at its end opposite the crank 82. Section 86b is connected to the crank 82. The two sections are joined by a clutch formed of a wedge 90 mounted in section 86a for reciprocal movement normal to its longitudinal axis. When positioned as shown, the wedge 90 abuts a chamfered surface 90a of section 86b for translating its movement toward the recess 88 to section 86a so that an extension of the latter will move into the recess 88. When moving in the opposite direction section 86b pulls section 86a along owing to a shoulder 90b of the former engaging a shoulder 90c of the latter. The extension of rod section 86a is connected to the shutter of the camera by way of a cable 94. When the extension of rod section 86a protrudes furthest into the recess 88 the shutter will be open, whereas with the extension retracted the shutter will be closed.

The wedge 90 is maintained in the position shown in FIG. 4 by engagement with a slidable member 92 biased into its position shown in FIG. 4 by helical spring 92a.

The member 92 is rigidly connected to an abutment 96 protruding through a slot in an outer corner formed by frame sections 34a and 34d. The abutment 96, under the bias of spring 92a is normally in a position removed from cover 38. It can, however, be moved towards the cover 38 pulling the slidable member 92 with it against the bias of the spring 92a. When so pulled the member 92 will disengage from the wedge 90. Thus, when the rod section 86b is moved towards the recess 88, its chamfered surface 90a pushes the wedge 90 into rod section 86a breaking the connection between it and section 86b. Accordingly, the movement of section 86b is not translated to section 86a and the extension of the latter does not move into the recess 88. The wedge 90 will return to its position shown in FIG. 4 when slidable member 92 is allowed to return to its original position under the bias of the spring 92a, both wedge 90 and member 92 being provided with appropriately bevelled surface portions to facilitate the repositioning of the wedge 90.

DESCRIPTION OF THE OPERATION OF THE EMBODIMENT

When it is desired to take a picture of an object placed on plate 12, with the camera 2 shown in FIG. 1, the photographer will first wish to frame and focus the object on the focussing screen 46. To do so, he lowers the screen 46 by rotating the shaft to the right by means of knob 40 (FIGS. 1-4). A first increment of this rotation is assisted by the spring bias on arms 42 and 44 effective until the frame 48 is nested between members 54 and 56 and is resting on frame sections 34a-d. Note that the frame 48 stays clear of the abutment 96. The screen 46 now covers the aperture 36 in precisely the planar position subsequently occupied by film material. During a second increment of the rotation, at which time the shaft does not drive the arms 42 and 44 owing to the lost motion connection, the crank 82 causes the rod section 86a to move into the recess 88 and by the cable 94 connected to the shutter causes the latter to open. The first and second rotational increments of the shaft extend through substantially the lost motion provided between the rotatable shaft and the pins 78. A third increment of rotation of the shaft, during which the pins 78 are engaged by the shaft, causes the blades 62 to be pushed to the right and inwardly towards the aperture 36 until the edges 66 are seated in the slots 48a of the screen frame 48. The screen 46 is now securely locked in the focal plane and the shutter is open allowing the photographer to compose and focus his picture in known manner, preferably with the lamps 14 illuminating the object on the plate 12.

When the photographer is satisfied with the scene composed and focussed, he rotates the knob 40 to the left (FIG. 1). A first increment of this rotation causes the crank 82 to withdraw rod section 86a out of the recess 88. The shutter thus closes. A second increment of the rotation causes the blades 62 to be withdrawn out of the slots 48a and to move to the left of the camera head 30 thus releasing the screen 46. A third increment of rotation lifts the screen 46 out of its nesting position between members 54 and 56 into the elevated position shown in FIG. 3. The space thus provided between the screen 46 and the camera head 30 is sufficient to permit the photographer slidingly from right to left (FIG. 1) to insert a film holder 98. The film holder 98 shown in FIG. 2 is of the kind used in connection with film units which permit processing in situ by well known diffusion transfer methods. Film holders for other film types are, however, equally suited for use with the camera head 30.

A leading edge of the film holder 30 engages the abutment 96 and pushes it toward the cover 38 to break the connection between rod sections 86a and 86b. When the photographer releases the knob 40 or rotates it to the right the screen 46 will be lowered against the film holder 98 and will be urged against it owing to the spring bias exerted against arms 42 and 44. Since the film holder 98 maintains the abutment 96 in its position adjacent cover member 38 to break the connection between rod sections 86a and 86b, further rotation of the shaft does not result in shutter opening. The third increment of rotation then causes the blades 62 to move to the right and inwardly against the film holder 98 to lock it in position in the manner previously described in connection with the focussing screen. The latter is preferably provided with slots 100, similar to slots 48a in the frame 48 of the focussing screen 46, into which the edges 66 of the blades 62 can enter to secure the film holder 98 in the camera head 30 as shown in FIG. 2. A slide which may cover the photosensitive surface of the film in the film holder is removed in a manner well known in the art. The film is then in condition for exposure by actuating the shutter by means, for instance, of cable release 102. The cover slide is thereafter repositioned over the photo-sensitive surface.

Subsequently, the knob 40 is rotated to the left (FIG. 1) causing the blade edges 66 to disengage from the slots 100 in the film holder 30 and to raise the screen 46. The film holder 98 may then be withdrawn. At that time, the abutment 96 is released and under the bias of spring 92a it, as well as slide 92, move to the right (FIG. 4) reestablishing the connection between rod sections 86a and 86b, so that when the screen 46 is next lowered for composing and focussing, the extension of rod section 86a again moves into the recess 88 to open the shutter by the cable 94.

The apparatus thus described offers distinct advantages over similar devices heretofore known. Simple rotation of a knob in one direction makes possible moving and locking a focussing screen into a precise position and simultaneously to open the shutter of the camera, for composing and focussing a photographic image. Rotation of the knob in the opposite direction closes the shutter, releases and lifts the focussing screen to allow convenient insertion of a film holder. Locking the film holder in position is again a simple matter of rotating a knob at which time, however, the camera shutter remains closed to permit subsequent exposure of the film by a separate shutter release.

I claim:

1. Apparatus for use with a photographic camera for alternately maintaining a focussing screen and a film holder in an operative position on a camera, comprising:
   (a) frame means comprising a plurality of sides defining a rectangular aperture;
   (b) means for mounting the frame on the camera;
   (c) shaft means mounted for rotation in opposite directions adjacent one side of the frame;
   (d) a focussing screen;
   (e) locking means;
   (f) means responsive to rotation of the shaft in one direction for moving the focussing screen into a position covering the aperture and responsive to rotation of the shaft in the opposite direction for moving the screen away from the aperture; and
   (g) means responsive to rotation of the shaft in the one direction for causing the locking means to lock the focussing screen in its position covering the aperture and responsive to the opposite rotation of the shaft for releasing the locking means from the focussing screen; whereby the film holder may be brought into engagement with the frame means when the focussing screen is in its position remote from the aperture.

2. The apparatus of claim 1, wherein the means for moving the focussing screen comprises at least one arm member connected to the shaft means for pivotal movement thereby through a lost motion connection.

3. The apparatus of claim 2, wherein the arm member is resiliently biased in the direction of the aperture.

4. The apparatus of claim 1, wherein the locking means comprises at least one blade member extending normal to the axis of the shaft and along one side of the aperture.

5. The apparatus of claim 4, wherein the blade member is connected to the shaft by a lost motion connection for movement parallel to and transversally of the aperture.

6. The apparatus of claim 5, wherein the blade member is slidably mounted on a side of the aperture by fastener means set in the side and received in a slot provided in the blade member, the slot having a section extending parallel to the aperture and a section extending at an angle thereto.

7. The apparatus of claim 6, wherein the focussing screen is provided with a slot aligned with the blade member when the focussing screen is in its aperture covering position for receiving the blade member.

8. Apparatus for use with a camera, said apparatus comprising:
   means, including a first frame, for defining a rectangular aperture and arranged to seatingly receive a film holder in operative relationship with said aperture to facilitate the exposure of the film unit retained in the film holder through said aperture;
   means for mounting said aperture defining means on the camera;
   a shaft extending adjacent one side of said first frame and being mounted for rotation about its axis from a first position through a second position to a third position;
   a locking member;
   a focussing screen assembly including a second frame, and said second frame including a recess formed in one peripheral edge thereof; and means for connecting said focussing screen assembly and said locking member to said shaft so that:
  (a) when said shaft is disposed in its said first position, said focussing screen assembly is seated on said first frame with its said focussing screen overlying said aperture and said locking member is engaged in said recess of said second frame of said focussing screen assembly,
  (b) when said shaft has been rotated from its said first position into its said second position said focussing screen assembly remains seated on said first frame and said locking member is disengaged from said recess of said second frame of said focussing screen assembly, and
  (c) when said shaft is rotated from its said second position into its said third position, said focussing screen assembly is withdrawn away from said first screen to facilitate the seating of the film holder on said first frame.

9. The apparatus of claim 8 wherein said connecting means is further arranged so that after the film holder has been seated on said first frame, the rotation of said shaft from its said third position towards its said second position causes said focussing screen assembly to seat on and over the film holder.

10. The apparatus of claim 9 additionally including means for urging said shaft from its said third position towards its said second position.

11. The apparatus of claim 10 wherein said connecting means includes an arm connecting said focussing screen assembly to said shaft and means independent of said arm for coupling said locking member to said shaft and wherein said urging means include a spring acting on said shaft through said arm so that when said shaft is in its said second position said spring does not urge said shaft towards its said first position.

* * * * *